Oct. 13, 1953 E. J. LATTNER 2,655,405
MOBILE SPRAYING EQUIPMENT
Filed Oct. 19, 1949 5 Sheets-Sheet 1

INVENTOR.
EMERT J. LATTNER
BY
Flournoy Corey
ATTORNEY.

Oct. 13, 1953

E. J. LATTNER 2,655,405

MOBILE SPRAYING EQUIPMENT

Filed Oct. 19, 1949

INVENTOR.
EMERT J. LATTNER
BY
Flournoy Corey
ATTORNEY.

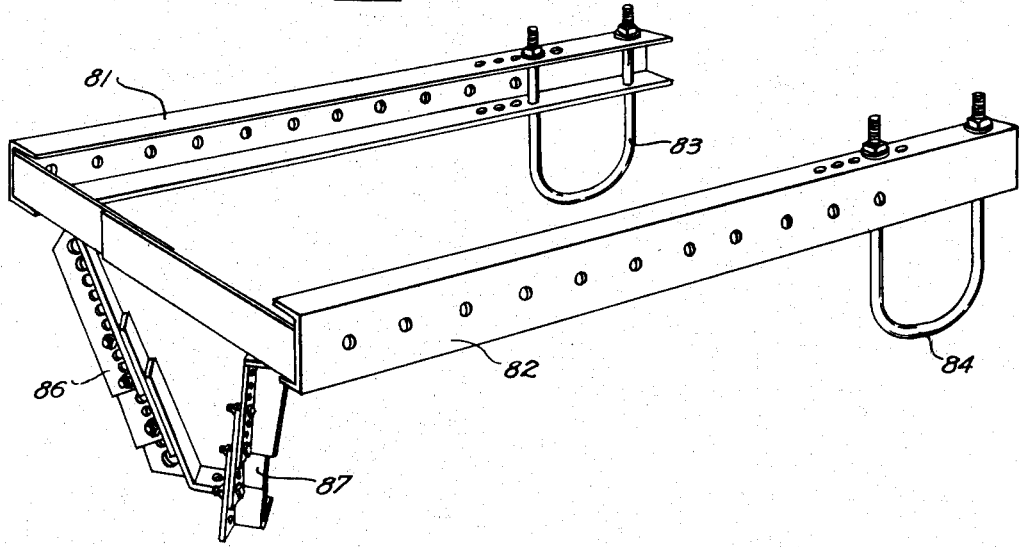
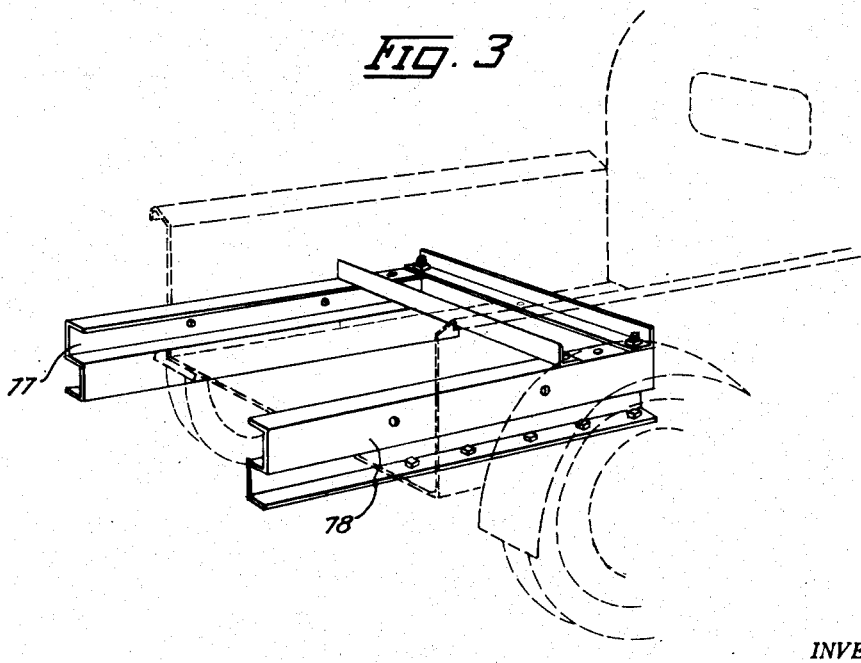

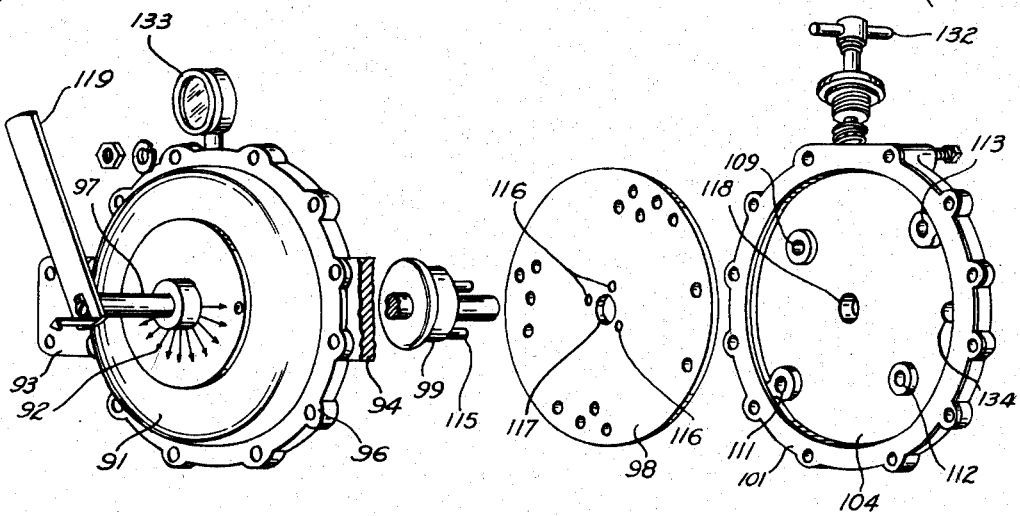
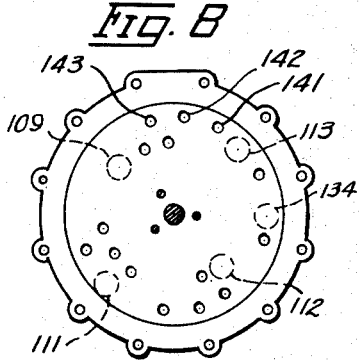
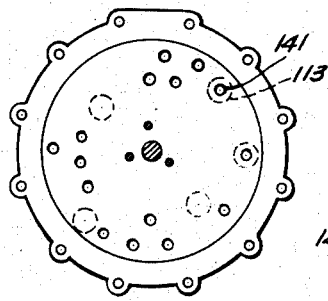
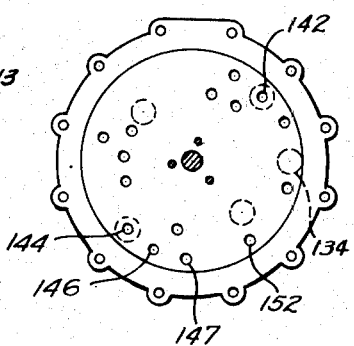
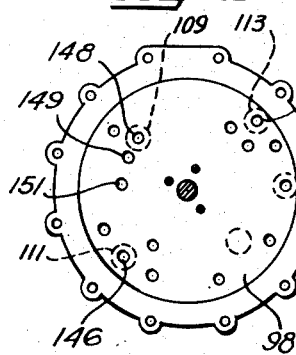
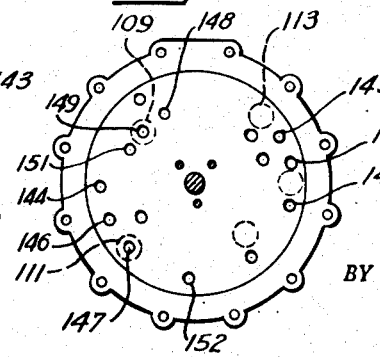

Oct. 13, 1953  E. J. LATTNER  2,655,405
MOBILE SPRAYING EQUIPMENT
Filed Oct. 19, 1949  5 Sheets-Sheet 5

INVENTOR.
EMERT J. LATTNER
BY
Flournoy Corey.
ATTORNEY.

Patented Oct. 13, 1953

2,655,405

UNITED STATES PATENT OFFICE 2,655,405

MOBILE SPRAYING EQUIPMENT

Emert J. Lattner, Cedar Rapids, Iowa

Application October 19, 1949, Serial No. 122,296

1 Claim. (Cl. 299—42)

This invention relates to spraying equipment and has particular relation to mobile spraying equipment adapted to spray DDT, 2,4-D or the like over wide strips, as for instance fields, roadsides and other areas.

It is one of the main objects of my invention to provide an extremely mobile and facile spraying rig which may be either towed by tractor, wagon, or mounted on a tractor or other vehicle by quick attachable mounts, or which may be self-propelled if desired.

Another object of my invention is to provide a device of this character having booms which may be readily controlled by the operator to be raised or lowered and held in any extreme or intermediate position as desired. Furthermore, such booms must be capable of resiliently moving away from an obstacle such as a fence, tree, or the like if the operator should inadvertently cause them to strike such an object.

Another important object of my invention is to provide a single control means such that the operator, by moving only one handle, may cause the spray fluid to be delivered from either or both booms or from a center boom or delivery pipe or combination of right or left booms with the center boom or all booms or to a flush conduit or to a utility conduit or all closed.

Another object of my invention is to provide a support means such that the spraying equipment may be mounted on a truck for transport or for spray use or may be mounted on a tractor or on a tractor trailer or, in fact, any mobile support.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claim, without departing from the spirit of the invention.

In said drawings:

Figure 1 is a view in perspective of one form of the spraying outfit as it appears when ready for attaching to a tractor or the like. In this embodiment of the invention, the device is adapted to carry two tanks of spray fluid.

In Figure 2 is illustrated another embodiment of the invention in which the device is adapted to be mounted on a supporting framework such as the truck mounted framework shown in Figure 3.

Figure 3 is therefore a view in perspective of the receiving framework on which the device shown in Figures 1 and 2 may be mounted, and this receiving framework is shown in position on a truck which is outlined in dotted lines.

Figure 4 is a view in perspective of a mounting for the spraying device which may be mounted directly on the truck or tractor.

Figure 5 is a view in exploded relation of the valve and valve housing which controls the flow of spraying fluid to the three booms, the utility conduit, and the flush conduit.

Figure 8 is a diagrammatic view illustrating the position of the valve plate when all ports are closed. The holes shown in full are holes through the movable valve plate. The dotted circles represent holes or ports in the housing leading to the left boom, the right boom, the center boom, and a utility connection. In this and the following Figures 8 to 17 inclusive, the plate is moved in ten successive steps in a clockwise direction to uncover the various ports singly and in various combinations.

Figure 9 is a diagrammatic view illustrating the position of the valve plate when the port leading to the left boom is open.

Figure 10 illustrates the position of the plate when both left and center booms are being supplied with spraying liquid.

Figure 11 illustrates the position of the plate when all ports are open.

Figure 12 illustrates the position of the plate when the right and center ports are uncovered by holes in the plate.

Figure 15:
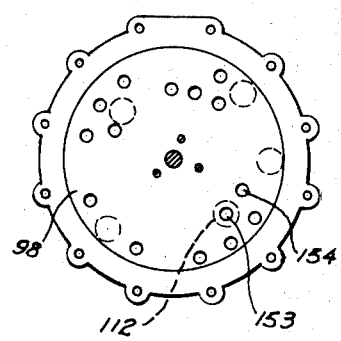
Figure 16:
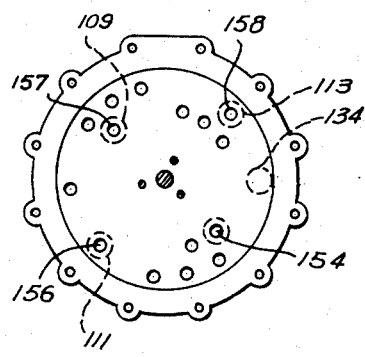
Figure 17:
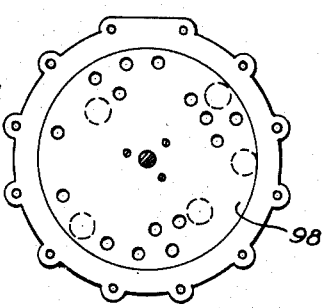

Figures 13 to 16 inclusive illustrate successive positions of the plate as the right boom port, the center boom port, the utility port and fluid port are individually uncovered, and Figure 17 illustrates a position of the plate alternative to Figure 8 in which all ports are again closed.

Figure 1:
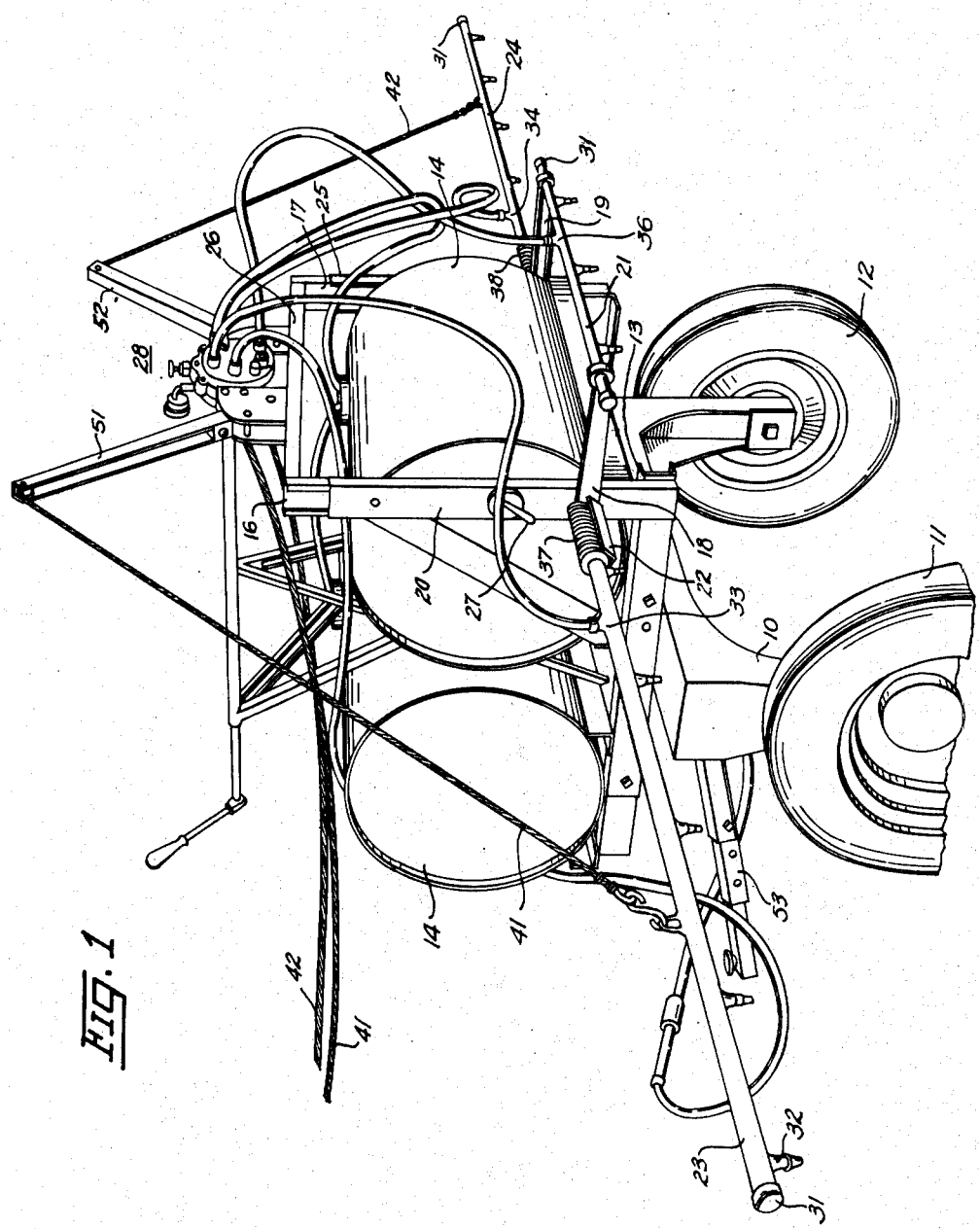

Referring, then, to the drawings, and more particularly to Figure 1 thereof; a device constructed according to one embodiment of my invention includes an arched frame 10 supported on trailer wheels 11 and 12, and an approximately rectangular frame 13 for supporting one or more barrels or tanks, illustrated at 14.

A pair of uprights 16 and 17 are mounted at the rear of frame 13 and these members are joined at their upper ends by cross member 26 to form a mount for the valve assembly and boom support, illustrated generally at 28.

Opposed channel members 20 and 25 are slideably and adjustably engaged on the uprights 16 and 17 for vertical movement and may be locked at any desired position by locking means such as illustrated at 27.

The channel members 20 and 25 carry arms 18 and 19 for supporting a center boom 21, and these arms also act as means for supporting trough-like members such as illustrated at 22, which support the inner ends of the left boom 23 and right boom 24.

The booms 23 and 24 consist of pipe sections closed at both their outer and inner ends as by caps 31, with the booms or pipes adapted to receive spray nozzles, such as that illustrated at 32. The left boom has an inlet at 33, while the right boom has an inlet at 34.

The center boom 21 is also closed by means of pipe caps, and it is provided with an inlet 36.

The inner ends of the booms are attached to the outer ends of coil springs 37 and 38, and normally these springs rest in the trough-like members 22, thus tending to cause the booms 23 and 24 to normally be biased toward their outwardly extending positions, as shown in Figure 1, at right angles to the line of travel of the trailer. The booms are supported from their outer ends by ropes or cables 41 and 42; and in use, if the booms strike an obstacle such as a fence post or the like, the obstacle will cause the booms to swing rearwardly about the flexible coupling members at 37 and 38, raising the outer ends of the coupling members 37 and 38 out of the trough and distorting the spring couplers 37 and 38.

As soon as the obstacle has been passed, the combination of the force exerted by the distorted spring members 37 and 38 and the trough 22 will cause the booms to return to their normal outwardly extending position.

Also, if it is necessary to raise either or both of the booms, the operator may pull on the ropes 41 or 42 or both to raise the booms. Since these ropes are trained backwardly through pulleys in the boom supports 28 and outwardly through supporting arms 51 and 52, the springs 37 and 38 permit the booms to readily swing upwardly as desired, and the booms may be locked in any position of tilt by a mechanism hereinafter more particularly described.

In order that a sprayer constructed according to my invention may have the greatest utility and adaptability, I have provided means whereby the rectangular framework supporting the structure may be mounted directly on a tractor or on the back of a truck or as a trailing vehicle.

It may be modified to carry one or two tanks, as desired. Many times it is desirable to transport the entire unit for demonstration purposes or the like on the back of a pick-up truck or such vehicle, and I have accordingly devised means for quick mounting and dismounting of the unit. The device shown in Figure 1 is, of course, self-supported and is adapted to be drawn by means of the trailer hitch 53.

Figure 2:
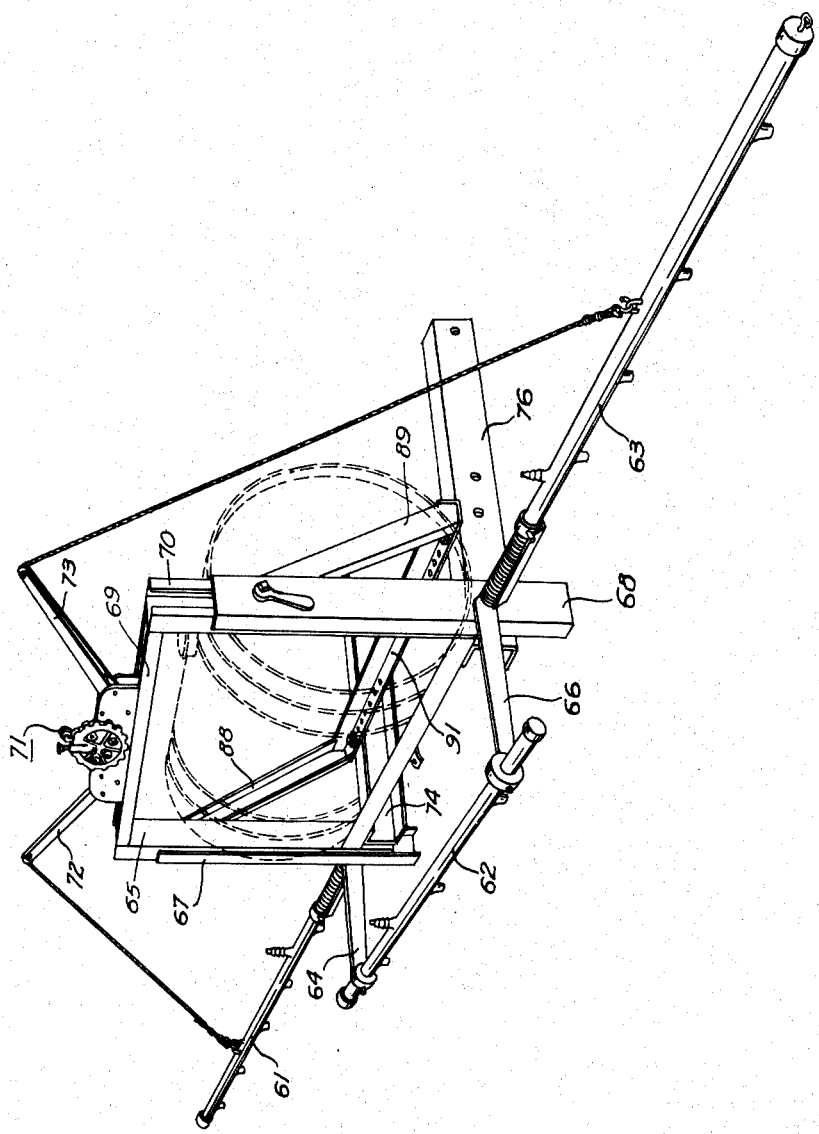

The device shown in Figure 2 is of essentially the same construction as that shown in Figure 1, and utilizes a left boom 61, a center boom 62, and a right boom 63. These members are supported on arms 64 and 66 which are in turn supported on slides 67 and 68. The uprights 65 and 70 support a cross member 69 which in turn supports the valve assembly 71 and the boom supporting means 72 and 73. The uprights 65 and 70 are welded to the outer ends of arms 74 and 76, and these arms 74 and 76 may be slid on over on the guides 77 and 78 of the pick-up truck, illustrated in Figure 3, or they may be slid on over the channels 81 and 82, which channels are adapted to be fastened by yoke members 83 and 84 to the rear axle of a tractor or the like, illustrated in Figure 4.

The telescopic members illustrated generally at 86 and 87 may be extended or retracted in such a manner that they may be engaged to the drawbar or other rearwardly extending portions of the tractor, so that three or four point mounting of the frame members 81 and 82 on the tractor may be effected.

The device shown in Figure 2 is adapted to carry one tank of spray liquid, and the uprights 67 and 68 are braced by means of braces 88 and 89, which are in turn fastened to the members 74 and 76 by means of the adjustable cross member 91.

An important part of my invention is the multiple valve structure, the operating position of which is illustrated in Figures 1 and 2, and the structure and operation of which is illustrated in Figures 5 to 17 inclusive.

It is desirable that the spraying operations be so implemented that they may be carried out by one operator. The corn borer and grasshopper plagues have reached such proportions that it is not always practical for more than one man to do the spraying. At times all three booms may be used. At other times it is practical to use only one or two booms, perhaps the center or left booms, or the two outer booms, or the center and the right boom. Furthermore the spraying material may clog the pumps or other apparatus, the valves, or the line, and it will be necessary for the operator to clean out these lines with the least effort and loss of time.

Hitherto a plurality of valves have been used to control the flow of liquid, and it was necessary for the operator either to stop and get down from the tractor, or other towing vehicle and adjust the flow of spray fluid, or else have a second man to do this work. I have provided a single control means readily controlled from the tractor seat, whereby the operator can open and close ports at will, either singly or in any combination as desired, as well as flush out the line or furnish fluid to any utility line.

Figure 6:
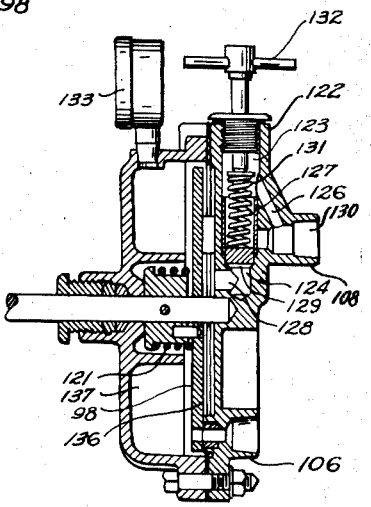
Figure 6 is a view in section of the valve and housing shown in Figure 5.
Figure 7:
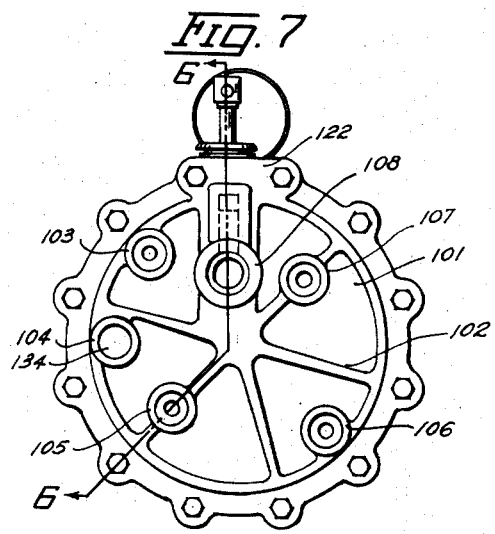
Figure 7 is a rear elevational view of the valve housing shown in Figures 5 and 6 with the various ports labeled. Since this view is of the rear of the housing shown in Figure 5, the position of the ports in the housing appear reversed from their positions as shown in Figure 5 and Figures 8 to 17.

A preferred embodiment of the device appears in exploded relation in Figure 5, and in cross section in Figure 6. The rear of the valve is shown in Figure 7, while Figures 8 to 17 inclusive illustrate the various positions the valve plate may have in the housing. The preferred device includes a recessed front housing or plate, illustrated at 91 having arrows or other indicia, as at 92, on the exposed face thereof to indicate the various operating positions of the plate. This member may be secured to the supporting members 93 and 94 by four of the peripheral lugs 96. The operating shaft 97, which rotates the plate 98 through the agency of the coupling 99, passes through a suitable boss in the cover plate 91.

The rear housing 101 is provided with strengthening webs or ribs 102 and cylindrical bosses 103 to 108 inclusive, through which ports or openings may be drilled and tapped to provide ports respectively for the left boom, the pump, the utility line, the center boom, the right boom, and the by-pass. Note that the relative position of these openings appears reversed in Figures 5 and 7 inasmuch as the rear housing is being viewed from the front in Figure 5, while it is being viewed from behind in Figure 7.

Only the ports 109 for the right boom, the port 111 for the center boom, the port 112 for the utility connection, the port 134 for the pump and the port 113 for the left boom pass entirely through the housing 101.

The coupling 99 is provided with three unequally spaced pins, two of which are illustrated at 115, and these three pins are received, when the valve is properly assembled, in the holes 116 in the disc-like valve plate 98, while the shaft 97 passes through the opening 117 in the plate 98 and into the opening 118 of the rear housing 101 in which it is journalled for rotation. Movement of the operating handle 119 produces rotation of the shaft 97, and thus the disc 98 is caused to rotate within the housings 91 and 101 to uncover the various ports as it rotates.

The plate 98 is biased against the faces of the ports 109, 111, 112 and 113 by means of the coil spring 121. A portion of the rear face of the housing 101 is provided with a boss 122 so that a conduit 123 may be provided, as illustrated at 123 in Figure 6, in order to limit the pressure and regulate the pressure of the fluid within the housing as desired. Fluid under excess pressure within the housing around plate 98 may escape through conduits 128 and 124, lift valve 129 and pass through the cylindrical guide 127 and out through the conduits 123 and 126 to escape through the by pass port 130.

The conduit 128 is closed by means of a check valve 129, pressure to which is supplied by means of spring 131, and the pressure on the spring is adjusted by means of the screw 132 so that by adjusting screw 132, the pressure within the housing may be regulated as desired. The amount of pressure within the housing is indicated by means of the pressure gauge 133.

A flexible conduit from the pump (not shown) leads into the housing through the port 134 in boss 104. Spray fluid from the pump fills the interior of the chamber through the port 134. The fluid passes into the chamber 136 back of the plate 98 and through the various openings of the plate and around the plate into the front chamber 137. Since the ports 109, 111, 112 and 113 are covered by the plate, except when openings in the plate, hereinafter described, uncover the ports, the fluid in the chamber 137 cannot pass into these ports until they are uncovered by the openings in the plate.

Observe, then, the openings 141, 142, and 143 in Figure 8. In this position, all of the ports 109, 111, 112, and 113 are covered by the plate, but as the plate is rotated in a clockwise direction to the position shown in Figure 9, the first of the openings 141 is positioned over the port 113, so that in the position of the plate shown in Figure 9, the spraying fluid may pass through the opening 141 into the left boom.

When the plate has been moved to a second position, illustrated in Figure 10, the second opening 142 still permits fluid to pass into the left boom as before, but in this position the first of a series of openings 144, 146, 147 and 152 is over the port 111 leading to the center boom. Therefore with the valve plate in the position shown in Figure 10, fluid is being supplied both to the left and to the center boom, while in the position shown in Figure 9, fluid is being supplied only to the left boom.

In the position of the plate 98, illustrated in Figure 11, the third opening 143 is over the port 113 leading to the left boom, the second opening 146 leading to the center boom is over the port 111 and the first of a series of openings 148, 149 and 151 has uncovered the port 109 leading to the right boom. Therefore, in this position of the plate, fluid is being supplied through opening 143 to the left boom, 146 to the center boom, and 148 to the right boom.

In the position of the plate illustrated in Figure 12, the left boom openings 141, 142 and 143 are out of register with the port 113 and consequently fluid cannot flow to the left boom. The third opening of the series 144, 146, 147 and 152 is in register with the port 111 of the center boom, and therefore fluid is flowing to the center boom. The second opening 149 of the series 148, 149 and 151 is in register with the port 109 of the right boom, and therefore fluid is flowing to both the right and center booms.

Figure 13:
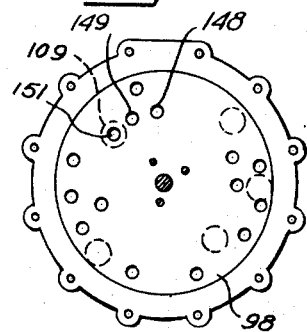

In Figure 13 the last of the three openings 148, 149 and 151 is in register with the port 109 of the right boom, while all the other ports are closed, so that fluid is flowing now only to the right boom.

Figure 14:
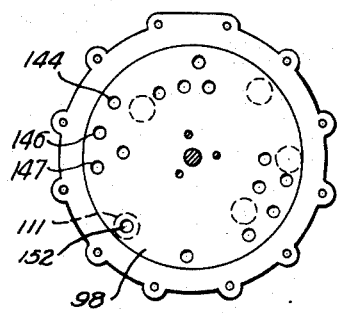

In Figure 14 the plate 98 has advanced to a position where the fourth opening 152 of the series 144, 146, 147 and 152 is in register with the port 111 of the center boom. This port 152 permits fluid to flow to the center boom while all other ports are closed.

In Figure 15 the plate 98 has been moved to a still further position in which the first of a series of two openings 153—154 uncovers the utility port 112 so that fluid flows to the utility line, which may be used to spray individual plants or areas as desired.

It is desirable, in one position of plate 98, that all of the ports be uncovered at one time so that the entire valve and all of the lines may be flushed out, and this condition is secured by rotating the plate to a position shown in Figure 16, at which position the utility port is uncovered by flush opening 154. The center port 111 is uncovered by the flush port 156. The right boom port 109 is uncovered by the flush opening 157 and the left boom port 113 is uncovered by flush opening 158.

Upon still further rotation of the disc 98 to the position shown in Figure 17, all ports are again closed.

It is apparent that by means of the system just described, the operator has complete control of the spraying operation from the seat of the vehicle on which the apparatus is mounted and can direct the spray fluid to any or all of the booms as desired, or to the utility outlet, or may flush all the ports. He may regulate the spray fluid pressure as desired.

The apparatus has extreme mobility and flexibility and may be mounted on truck, or tractor, or towed vehicle such as a trailer.

Although I have described several embodiments of my invention, it is apparent that modifications thereof may be made by those skilled in the art. Such modifications may be made without departing from the spirit and scope of my invention as set forth in the appended claim.

I claim as my invention:

In a sprayer, a left boom, center boom and right boom, conduits leading to these three booms, a utility hose and a valve for selectively supplying spraying fluid to these outlets comprising a drum-like valve housing having a plurality of ports in one wall thereof, conduits connecting the booms and hose each to a port, the said wall also having a bypass port and check valve therein, a disc valve having a plurality of openings therethrough to uncover the various ports singly or in combination, a port in the wall leading into the interior of the valve housing, a rod and lever for rotating the disc, the valve housing being mounted near the operator so he may effect distribution to the various outlets without leaving his seat.

EMERT J. LATTNER.

References Cited in the file of this patent

UNITED STATES PATENTS

| Number | Name | Date |
|---|---|---|
| 1,043,929 | Heard | Nov. 12, 1912 |
| 1,154,177 | Detwiler | Sept. 21, 1915 |
| 1,482,770 | Terrell | Feb. 5, 1924 |
| 1,686,450 | Henry | Oct. 2, 1928 |
| 1,887,092 | Glase | Nov. 8, 1932 |
| 2,210,346 | Stayton | Aug. 6, 1940 |
| 2,246,866 | Stribling et al. | June 24, 1941 |
| 2,273,344 | Black et al. | Feb. 17, 1942 |
| 2,314,298 | Welch | Mar. 16, 1943 |
| 2,432,309 | Gore | Dec. 9, 1947 |

OTHER REFERENCES

Century Sprayer advertisement in Farm Implement News, November 18, 1948, page 17; published by Farm Implement News Company, Chicago, Ill.